United States Patent [19]
Gachot et al.

[11] 4,061,156
[45] Dec. 6, 1977

[54] TRANSITION MODULE FOR A PNEUMATIC SEQUENCER AND AN ASSOCIATED SEQUENCER

[76] Inventors: Jean Gachot, 26 bis, Avenue de Paris, Soisy-Sous-Montmorency, Val d'Oise; Siméon Lekarski, 138, Boulevard de la Republique, Saint-Cloud, Hauts-de-Seine, both of France

[21] Appl. No.: 667,219

[22] Filed: Mar. 15, 1976

[30] Foreign Application Priority Data
Mar. 20, 1975 France .............................. 75.08720

[51] Int. Cl.² .......................... F16K 11/00; F15C 3/00
[52] U.S. Cl. ..................................... 137/109; 137/269; 137/561 A; 137/599; 137/829; 137/861
[58] Field of Search .............. 137/608, 829, 599, 119, 137/269, 271, 109, 561 A; 235/201 ME

[56] References Cited
U.S. PATENT DOCUMENTS

| 3,602,246 | 8/1971 | Hettinger et al. | 137/608 X |
|---|---|---|---|
| 3,750,707 | 8/1973 | Dordoni | 137/829 X |
| 3,875,959 | 4/1975 | Bouteille | 235/201 ME |
| 3,889,711 | 6/1975 | Hirao | 235/201 ME |

Primary Examiner—William R. Cline
Attorney, Agent, or Firm—Young & Thompson

[57] ABSTRACT

The transition module is intended to be assembled with at least three action modules constituting a sequencer and comprises an elementary logical gate having two inputs and one output, two inputs for receiving the output signals of two predetermined action modules and directing the signals to the inputs of the logical gate, one output for directing the output of the logical gate towards a predetermined input of the third action module and a Y-duct for directly connecting the output of the third action module to a predetermined input of each of the first two action modules.

11 Claims, 12 Drawing Figures

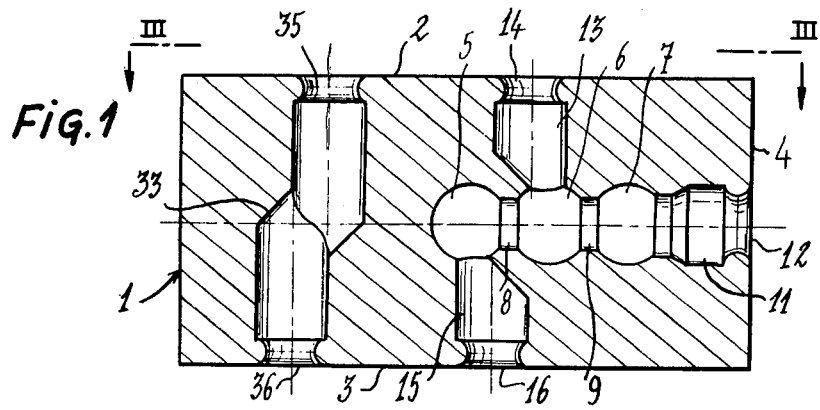
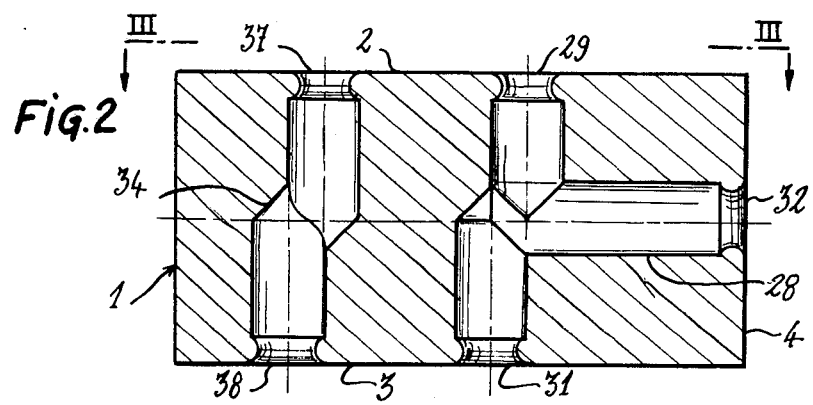
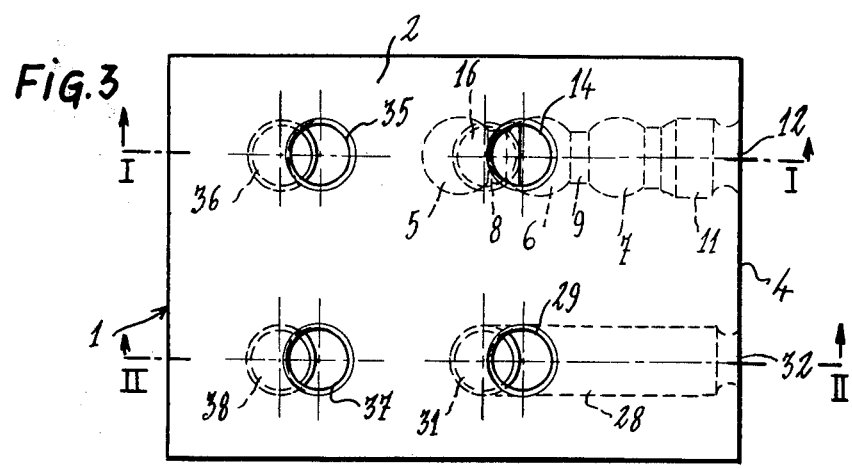

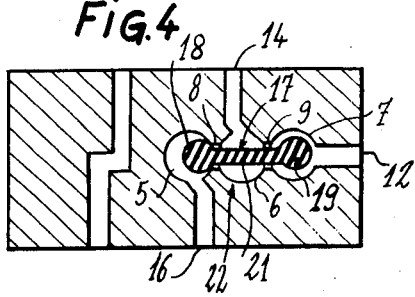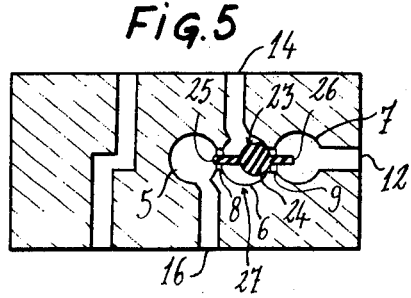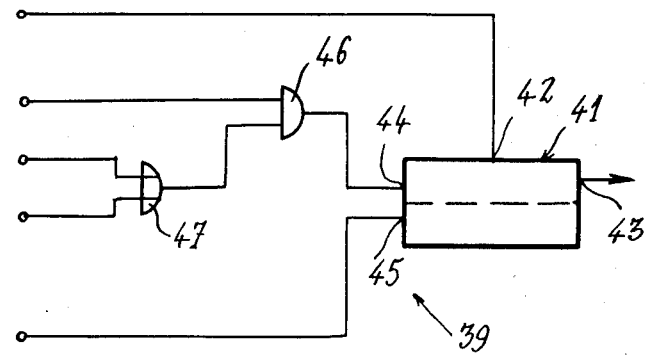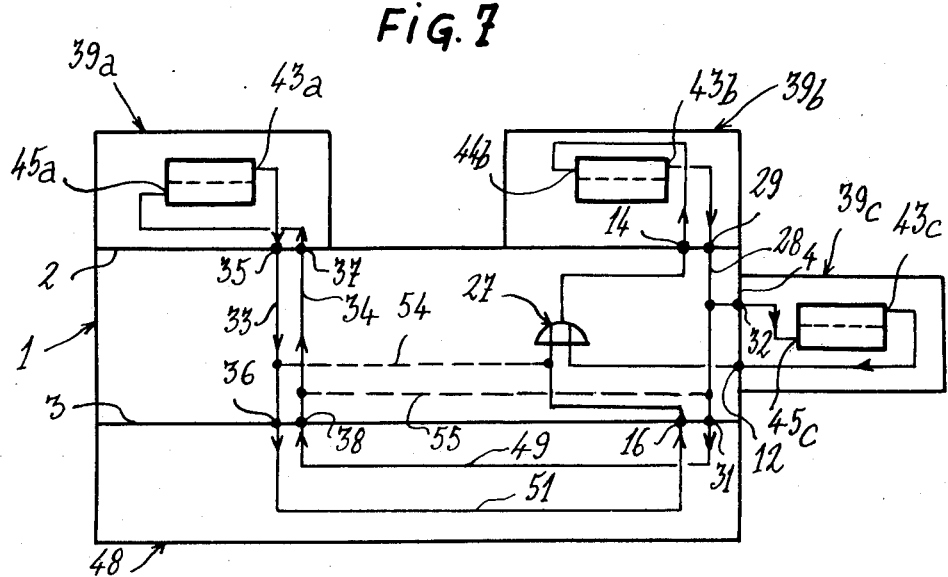

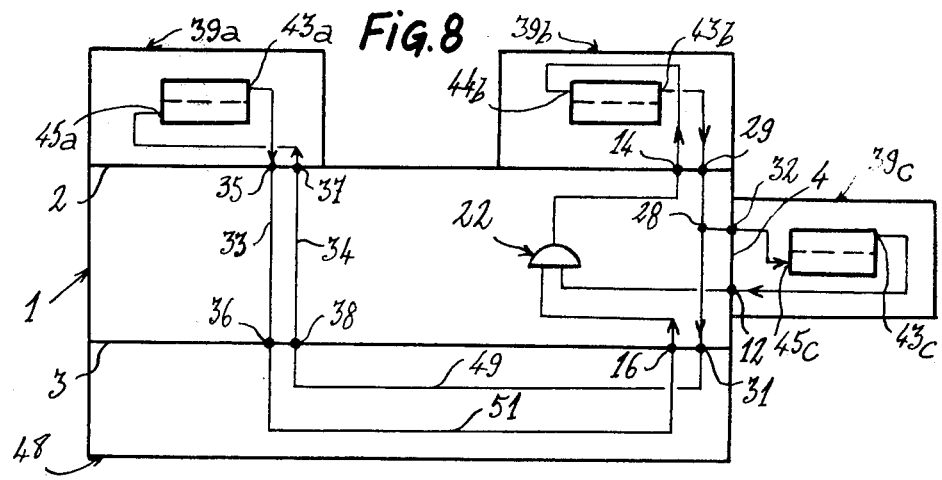
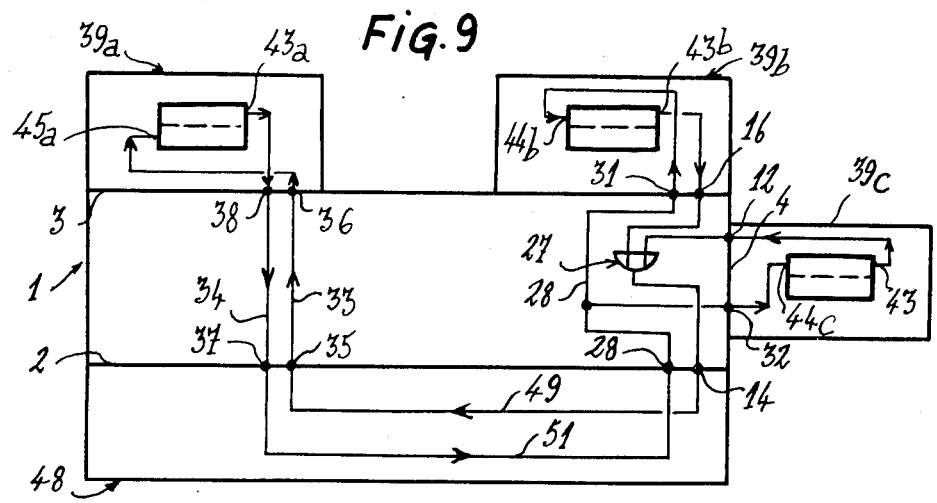
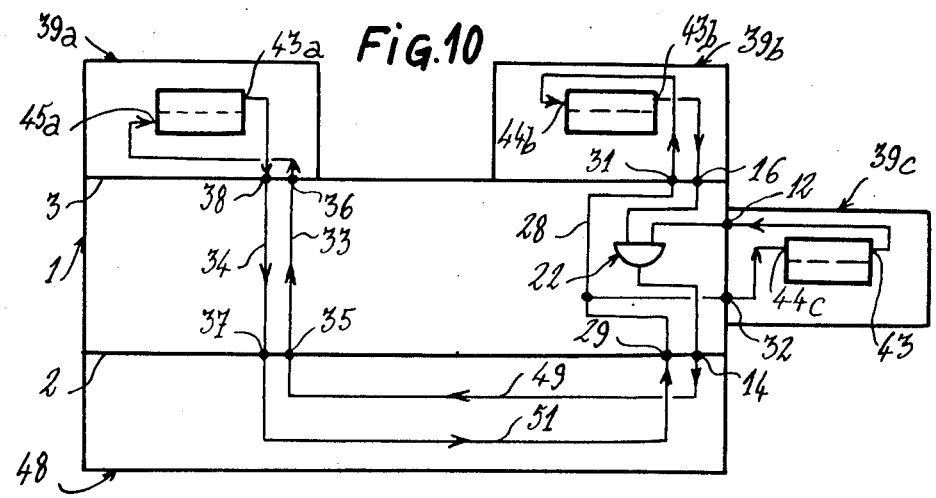

TRANSITION MODULE FOR A PNEUMATIC SEQUENCER AND AN ASSOCIATED SEQUENCER

BACKGROUND OF THE INVENTION

This invention relates to a transition module for a pneumatic sequencer, especially a pneumatic sequencer having a branched flow diagram. By way of novel industrial product, the invention is also concerned with a sequencer which makes use of a module of this type.

By sequencer is meant in this case a cybernetic system for automatically initiating successive industrial operations in a predetermined order.

It is known that a sequencer of this type as conveniently represented by a flow diagram is composed of a certain number of action modules. Taken separately, an action module is a device for receiving an order on a control input and emitting an output signal so as to initiate the operation of a given machine. In a sequencer, these modules are mounted in stages so that each module is capable of initiating the operation of a machine but also of producing action on the control input of another action module located downstream with respect to the predetermined sequential order of operations.

One of the essential conditions imposed by the operation of the sequencers is a strict sequentiality of the different operations which make up the flow diagram. To this end, it is a known practice to provide each module with at least one input which is responsive to a triggering variable which produces action as an AND conjunction with the output of the module located upstream (in the direction of the sequence) so as to control the output signal of the module considered. The triggering variable can be a signal which indicates that the machine located upstream has completed its operation. It is thus ensured that the machine located downstream will begin to operate only after completion of the operation performed by the upstream machine, which accordingly represents strict sequentiality.

Similarly, it is essential to ensure that the upstream machine cannot in any event be again put into operation before the downstream machine has completed its task. This problem is similar to the preceding and can be solved by the same known means. These means are relatively simple in the case of a sequencer having a linear flow diagram, namely in which each action module communicates only with two other modules, one module being located upstream and the other being located downstream.

The same does not apply to sequencers of the branched flow diagram type in which a plurality of upstream modules are capable of producing action in conjunction (AND or OR, for example) on one and the same downstream module or alternatively in which one and the same upstream module can produce action in disjunction (AND or OR) on a plurality of downstream modules. It is necessary in that case to provide a device which performs the logical operation aforesaid and at the same time initiates the inhibitions mentioned above in order to ensure sequentiality of operations.

To this end, it is a known practice to construct modules which will be designated as control modules and comprise the equivalent of the assembly of downstream action modules and a logical operator. Control modules of this type comprise control inputs and signal outputs for actuating the machines to be controlled. However, these modules must be capable of performing any conceivable logical function, not only the four basic functions mentioned above but also more or less complex combinations of these functions in a theoretically infinite number. In consequence, these control modules must be fabricated in accordance with customers' requirements in the case of each type of sequencer.

The aim of the present invention is to produce a single-connection module designated hereinafter as a transition module for connecting the action modules of the sequencer to each other and performing the desired logical operation while having a universal character which permits the use of the module for the purpose of performing any logical function, even a complex function, and serves at the same time to establish the necessary inhibition connections for ensuring strict sequentiality of the operations of the different stages of the sequencer.

SUMMARY OF THE INVENTION

In accordance with the invention, the universal transition module for a pneumatic sequencer, in particular for a sequencer having a branched flow diagram, is intended to be assembled with at least three action modules which produce action on each other in accordance with a predetermined logical law so as to constitute the sequencer, each action module being provided with a control input, an inhibition input and an output, and is characterized in that it comprises:

- an elementary logical gate having two inputs and one output,
- two inputs for receiving the output signals of two modules predetermined among the action modules aforesaid and directing said signals to the inputs of the logical gate,
- one output for directing the output of the logical gate towards an input which is predetermined among the inputs of the third action module,
- and a Y-duct for providing a direct connection between the output of the third action module and an input which is predetermined among the inputs of each of the two first action modules.

The transition module as thus designed makes it possible according to the mode of connection of the action modules to perform conjunction or disjunction operations which are themselves of the OR type or of the AND type according to the nature of the elementary logical gate. At the same time, the connection between the output of the downstream module or modules and the inhibition input of the upstream module or modules makes it possible to ensure the strict sequentiality required.

In accordance with a particular feature of the invention, the elementary gate of the transition module comprises an identical cavity for performing the elementary AND operation and the elementary OR operation and a valve which alone differs from one operation to the other. The universal character of the transition module is thus achieved.

In accordance with a preferred embodiment of the invention, the transition module comprises two independent ducts which are bored from one side to the other and which, in conjunction with a bridging block, permit stacking of a plurality of transition modules in order to carry out complex combinations of the basic operations defined earlier.

BRIEF DESCRIPTION OF THE DRAWINGS

Further properties and advantages of the invention will become apparent from the following detailed description, reference being made to the accompanying drawings which are given by way of example but not in any limiting sense, and wherein:

- FIG. 1 is a view in sectional elevation of the transition module in accordance with the invention, this view being taken along line I—I of FIG. 3;
- FIG. 2 is a sectional view in elevation taken along line II—II of FIG. 3;
- FIG. 3 is a plan view taken along line III—III of FIGS. 1 and 2;
- FIGS. 4 and 5 are similar to FIG. 1 but are schematic sectional views showing the construction of the elementary AND and OR gates respectively;
- FIG. 6 is a standard schematic representation of an action module;
- FIGS. 7 to 10 are diagrams showing the application of a module according to the invention to the performance of the basic conjunction and disjunction operations mentioned earlier.

DESCRIPTION OF THE PREFERRED EMBODIMENTS

Figures 11, 12:
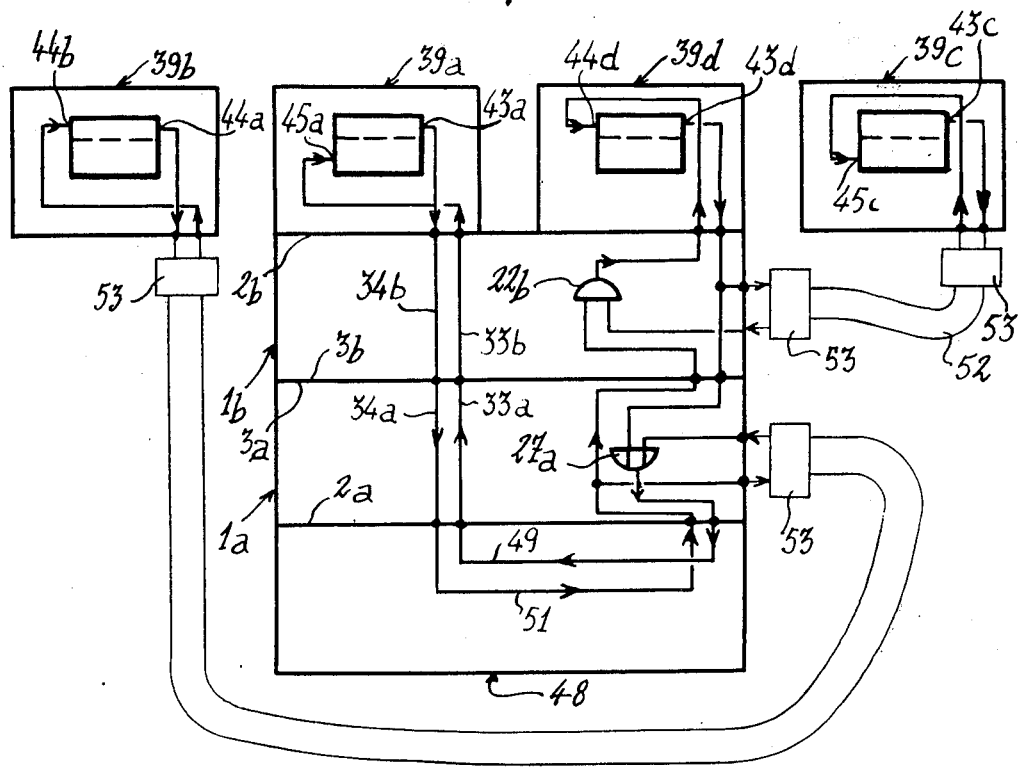
- FIG. 11 is a diagram showing the application of a plurality of transition modules to the performance of a complex operation.
- FIG. 12 is a graph representing the complex operation performed by application of FIG. 11.

Referring first to FIGS. 1 to 3, the transition module 1 is constituted by a block of rigid material having in particular a first face 2, a second face 3 located opposite to the first, and a lateral face 4.

Three substantially spherical and aligned cavities 5, 6, 7 are bored in said block and communicate with each other by means of throats 8, 9. One of the end cavities 7 communicates via a passage 11 with a port 12 formed in the lateral face 4. The central cavity 6 communicates via a passage 13 with a port 14 formed in the first face 2. The other end cavity 5 communicates via a passage 15 with a port 16 formed in the second face 3.

The entire series of cavities 5 to 7 is capable of cooperating with a control valve 17 of resilient material made up of two bails 18, 19 located respectively within the spherical cavities 5 and 7 and joined together by means of a stem 21 (as shown in FIG. 4). The balls 18, 19 are smaller in diameter than the spherical cavities 5 and 7 and the valve-stem 21 has a length such that the control valve 17 is capable of moving along the common axis of the spherical cavities 5 to 7 in order to close off either the throat 8 or the throat 9.

It is apparent that the above-mentioned assembly constitutes an elementary logical AND gate 22, the inputs of which are the ports 12 and 16 and the output of which is the port 14. In fact, if a pressure is applied to only one of the ports 12 or 16, the control valve 17 comes into the position of closure and no pressure appears at the port 14. However, if a pressure is applied simultaneously to the ports 12 and 16, the control valve 17 assumes a mean position which has the effect of establishing said pressure on the port 14 via the throats 8 and 9.

It is also possible to employ a control valve 23 (as shown in FIG. 5) made up of a single ball 24 which is located within the central cavity 6 and may be provided with two guide stems 25, 26. There is accordingly obtained an elementary logical OR gate 27, the inputs of which are the ports 12 and 16 and the output of which is the port 14. In fact, a pressure applied to one of the ports 12 or 16 or to both ports simultaneously is always transmitted to the port 14.

The transition module 1 further comprises a Y-duct 28 which is located in the plane of FIG. 2 and provides a direct connection between a port 29 formed in the face 2, a port 31 formed in the face 3 and a port 32 formed in the face 4.

Finally, two independent ducts 33 and 34 located respectively in the planes of FIGS. 1 and 2 pass right through the module 1 from one side to the other. The duct 33 provides a connection between a port 35 of the face 2 and a port 36 of the face 3 and the duct 34 provides a connection between a port 37 of the face 2 and a port 38 of the face 3. Each duct aforesaid is composed of two sections having relatively displaced axes, said relative displacement being equal to the displacement of the ducts 13 and 15 which is technologically necessary. The same relative displacement of axes is again observed between the ports 29 and 31 of the Y-duct 28. An explanation of this will be given later in the description.

In order to gain a clearer understanding of the operation of the transition module in cooperation with action modules, an action module of this type will now be briefly described with reference to FIG. 6.

The action module 39 essentially comprises a memory cell 41 provided with a feed input 42 and with a signal output 43. The memory cell 41 further comprises a control input 44 for initiating the appearance of the output signal at 43 and an inhibition input 45 for preventing the appearance of said signal.

The control signal applied to the input 44 results, in the AND conjunction, from the output signal of the preceding action module in the sequence and from a triggering signal, the conjunction being performed in an AND gate 46. The triggering signal can in turn result from a number of triggering variables which drive an OR gate 47.

The inhibition signal applied to the input 45 is derived from the output of the following action module in the order of the sequence in order to ensure strict sequentiality of operations by preventing the action of the module 39 when the following module produces action.

It is apparent that this description of the action module 39 is given solely by way of indication in order to obtain a better understanding and that said module could in actual fact have more complex functions. The following discussion will be limited to the output 43 and the inputs 44 and 45 which will be considered as inputs and output of the action module whereas the other elements will be taken for granted and are in any case not shown in FIGS. 7 to 11.

Referring to FIGS. 7 to 11, there will now be described a number of assemblies of the transition module 1 with action modules such as 39 for performing fundamental operations.

FIG. 7 shows diagrammatically a sequencer obtained by the assembly, by means of a transition module 1 in accordance with the invention, of two action modules 39a and 39c which produce action in an OR conjunction on a third action module 39b located downstream of the two others in the direction of the sequence. To this end, the elementary logical gate of the module 1 is an OR gate 27 provided with a control valve of type 23.

The two action modules 39a and 39b are inserted by known means in the face 2 of the transition module 1 so as to ensure that the output 43a of the module 39a is connected to the port 35 of the duct 33 and that its inhibition input 45a is connected to the port 35 of the duct 34 and so as to ensure that the output 43b of the module 39b is connected to the Y-duct 28 and that its control input 44b is connected via the port 14 to the output of the gate 27.

The action module 39c is inserted into the lateral face 4 of the module 1 so as to ensure that its output is connected via the port 12 to one input of the gate 27 and that its inhibition input 45c is connected to the Y-duct 28.

A bridging block 48 comprising two separate ducts 49 and 51 is inserted into the face 3 of the module 1 so as to connect on the one hand the port 36 to the port 16, that is to say the output of the module 43a to the other input of the gate 27 and on the other hand the port 31 to the port 38, that is to say the output of the module 39b to the inhibition input 45a of the module 39a.

If neither of the modules 39a or 39c emits an output signal, said signal is transmitted via the gate 27 and the port 14 to the control input 44b of the module 39b which in turn emits a signal at its output 43b provided that permission is given by triggering variables, the operating device of which is not illustrated as stated earlier. The signal emitted at 43b drives the inhibition inputs 43a and 43c of the respective modules 39a and 39c via the Y-duct 28, thus discontinuing the action of these two modules in order to maintain strict sequentiality of operations.

FIG. 8 illustrates diagrammatically a sequencer which is similar to the preceding but in which the two upstream action modules 39a and 39c produce action on the downstream module 39b in the AND conjunction. The only difference with respect to the previous device is that, in this case, the elementary logical gate is an AND gate 22 obtained by making use of a control valve of type 17.

In this instance, the two upstream modules 39a and 39c must emit an output signal simultaneously in order to ensure that the control input 44b of the module 39b is driven via the gate 22 and that the module 39b emits a signal at its output 43b. When the signal has been emitted, this latter drives the inhibition inputs 45a and 45c of the upstream modules 39a and 39c via the Y-duct 28.

The diagram of FIG. 9 represents a sequencer which serves to perform the fundamental OR disjunction operation of an upstream module 39a on two downstream modules 39b and 39c. In other words, the module 39a initiates the action of either of the two modules 39b or 39c which is permitted to operate at this instant by the state of the triggering variables. The upstream module 39a is subsequently inhibited.

The main difference with respect to the diagram of FIG. 7 lies in the fact that the faces 2 and 3 of the transition module 1 have been reversed. This does not produce any change in regard to the independent ducts 33 and 34. In this instance, however, the output 43b of the module 39b drives one input of the gate 27 whereas the output of said gate drives the inhibition input 45a of the module 39a via the bridging block 48. Moreover, if the output 43c of the module 39c again drives the other input of the gate 27, its control input 44c is connected to the Y-duct 28 in this case.

It is now possible to understand the need for relative displacement of the axes on the one hand of the ducts 33 and 34 and on the other hand of the ports 29 and 31 of the Y-duct 28. In fact, at the time of reversal of the module 1, the relative axial displacement of the ports 16 and 14 of the logical gate further entails the need for translational displacement of the module 1 in order to substitute one of these two ports for the other. The above-mentioned relative axial displacements are intended to take said translational displacement into account.

When the upstream module 39a emits a signal at its output 43a, the control inputs 44b and 44c of the downstream modules 39b and 39c are driven simultaneously and, as soon as one of these two modules is permitted to come into action by its triggering variables, its output signal accordingly inhibits the upstream module 39a via the gate 27.

The diagram of FIG. 10 relates to a sequencer for performing an AND disjunction operation of an upstream action module 39a on two downstream action modules 39b and 39c. In other words, the module 39a initiates the action of both modules 39b and 39c at the same time. The only difference with respect to the preceding diagram lies in the fact that the logical gate is an AND gate 22 in this instance. In consequence, inhibition of the upstream module 39a occurs only after the two downstream modules 39b and 39c have both come into action.

FIG. 11 gives one example of sequencer which performs a complex operation as shown diagrammatically in FIG. 12, namely an OR disjunction followed by an AND conjunction. More precisely, a first upstream module 39a produces action on the one hand on a second module 39b in an OR disjunction and on the other hand on a fourth module 39d in an AND conjunction with a third module 39c.

The assembly comprises a first transition module 1a constructed and arranged in accordance with FIG. 9 (OR disjunction) and a second transition module 1b constructed and arranged in accordance with FIG. 8 (AND conjunction) which are plugged into each other in the order of the sequence, the stack thus obtained being completed by a bridging block 48.

The action modules 39a and 39d are plugged into the face 2b of the transition module 1b as in the case of FIG. 8. The action modules 39a and 39c could be plugged directly into the respective lateral faces 4a and 4b of the transition modules 1a and 1b. In order to broaden the scope of application, however, said action modules have been designed in this case to be maintained at a distance from each other for any particular reason and provision has been made for flexible connections 52 and connecting blocks 53.

The output signal emitted by the module 39a is applied simultaneously to the control input 44b of the module 39b and to the AND gate 22b. If the module 39b is then permitted and if the gate 22b does not receive any permission, the module 39b comes into action and its output accordingly inhibits the upstream module 39a via the OR gate 27a. On the contrary, if the module 39b is not permitted and if the module 39c emits a signal, then the AND gate 22b becomes operative and the control input 44d of the module 39d is activated. This module then emits an output signal which will on the one hand directly inhibit the module 39c and on the other hand inhibit the module 39a via the gate 27a.

The invention therefore provides a universal transition module which makes it possible to perform any one of the four fundamental logical operations mentioned above, the most that this requires being to change a control valve which is placed in position simply by deformation. Furthermore, it is possible simply by stacking any desired number of these modules to construct sequencers which perform the most complex operations including those described in the foregoing which are clearly given only by way of example.

It is apparent that the module thus described and the assemblies associated therewith also permit many alternative forms of construction which would not constitute any departure from the scope of the invention. It would thus be possible to dispense with the need for a bridging block 48 by forming ducts 49 and 51 in the body of the module 1 along the dashed lines 54, 55 (shown in FIG. 7) in the vicinity of the face 3. However, in order to maintain the universal character of the module, it would then be advisable to provide similar ducts 56, 57 (not shown) in the vicinity of the face 2 and means for shutting-off in accordance with requirements either the ducts 54, 55, or the ducts 56, 57, or even these four ducts if the module is placed in position 1b of FIG. 11.

We claim:

1. A universal transition module for a pneumatic sequencer, in particular for a sequencer having a branched flow diagram, said module being intended to be assembled with three action modules, two of said action modules being located upstream and producing action in conjunction on the third action module located downstream, or one of said action modules being located upstream and producing action in disjunction on the both other action modules located downstream, each action module being provided with a control input to receive a control signal, an inhibition input to receive an inhibition signal and an output to deliver an output signal, said transition module being an integral block comprising:

an elementary logical gate for receiving two input signals by means of respective ducts terminated by two input ports of said gate, and for delivering one output signal by means of a one duct terminated by one output port of said gate, said input ports of said gate being so disposed as to receive the output signals of the both action modules located upsteam or of the two action modules located downstream, and said output port of said gate being so disposed as to deliver the output signal of said gate to the control input of the one action module located downstream or to the inhibition input of the one action module located upstream;

a Y-duct provided with one input port and two output ports so disposed to transmit the output signal of the one action module located downstream to the inhibition input of the both action modules located upstream, or to transmit the output signal of the one action module located upstream to the control inputs of the both action modules located downstream.

2. A transition module according to claim 1, wherein the elementary gate is constituted by a duct in which a control plug of resilient material is capable of displacement, said duct comprising three spherical communicating cavities in aligned relation, the central cavity being connected to said output port of said gate, and the end cavities being connected to said input ports of said gate.

3. A transition module according to claim 2, wherein the control plug comprises a ball located within the central cavity so as to perform the elementary function OR.

4. A transition module according to claim 2, wherein the control plug comprises two balls located within the end cavities and connected to each other by means of a stem, so as to perform the elementary function AND.

5. A pneumatic sequencer comprising two action modules located upstream producing action in conjunction on a third action module located downstream, each of said action modules being provided with a control input to receive a control signal, an inhibition input to receive an inhibition signal and an output to deliver an output signal, said sequencer further comprising a transition module which is an integral block connected to said three action modules, said block comprising an elementary logical gate having an output port located on a first face of said block, a first input port located on a second face of said block, opposite to said first face, and a second input port located on a third face of said block, said block further comprising a Y-duct having an input port located on said first face, a first output port located on said second face and a second output port located on said third face, there being two independent ducts between said first face and said second face of the block and a bridging block mounted on said second face of the transition module so as to connect one of the two independent ducts to the first input of the logical gate and the other independent duct to the Y-duct, wherein the two upstream action modules are mounted so that any one of said modules is mounted on the first face aforementioned in cooperating relation with the independent ducts and the other module is mounted on said third lateral face so that the respective outputs thereof are connected to the inputs of the logical gate and that the inhibition inputs thereof are connected to output ports of the Y-duct, and wherein the downstream action module is mounted on the first face aforementioned so that the output thereof is connected to the input port of the Y-duct and that the control input thereof is connected to the output of the logical gate.

6. A pneumatic sequencer according to claim 5, wherein the logical gate is an OR-gate.

7. A pneumatic sequencer according to claim 5, wherein the logical gate is an AND-gate.

8. A pneumatic sequencer comprising one action module located upstream producing action in disjunction on two action modules located downstream, each of said action modules being provided with a control input to receive a control signal, an inhibition input to receive an inhibition signal, and an output to deliver an output signal, said sequencer further comprising a transition module which is an integral block connected to said three action modules, said block comprising an elementary logical gate having an output port located on a first face of said block, a first input port located on a second face of said block, opposite to said first face, and a second input port located on a third face of said block, said block further comprising a Y-duct having an input port located on said first face, a first output port located on said second face, and a second output port located on said third face, there being two independent ducts between said first face and said second face of the block and a bridging block mounted on said first face of the transition module so as to connect one of the two independent ducts to the output of the logical gate and the other independent duct to the Y-duct, wherein the upstream action module is mounted on said second face in cooperating relation with the independent ducts so that the output thereof is connected to the input port of the Y-duct and that the inhibition input thereof is connected to the output of the logical gate, and wherein the two downstream action modules are mounted respectively so that any one of said modules is mounted on said second face and the other module is mounted on said third lateral face so that the respective outputs thereof are connected to the inputs of the logical gate and that the control inputs thereof are connected to the output ports of the Y-duct.

9. A pneumatic sequencer according to claim 8, wherein the logical gate is an OR-gate.

10. A pneumatic sequencer according to claim 8, wherein the logical gate is an AND-gate.

11. An integrated pneumatic sequencer comprising a number of action modules for performing a combination of OR and/or AND disjunction and/or conjunction operations in sequence of at least two or said action modules located upstream on at least two of said action modules located downstream, each of said action modules being provided with a control input to receive a control signal, an inhibition input to receive an inhibition signal and an output to deliver an output signal, said sequencer further comprising a number of transition modules equal to the number of said combined operations, said transition modules being arranged in a stacked relation and the stack being completed by a bridging block at one end, each of said transition modules being identical to each other and being an integral block comprising an elementary logical OR-gate or AND-gate having an output port located on a first face of said block, a first input port located on a second face of said block, opposite to said first face, and a second input port located on a third face of said block, said block further comprising a Y-duct having an input port located on said first face, a first output port located on said second face, and a second output port located on said third face, the contact faces of two consecutive modules of the stack being respectively a first face and a second face if the two corresponding consecutive operations are of the same nature, and two first faces or two second faces if the two corresponding consecutive operations are of different nature, two of the action modules being connected to the end of the stack opposite to the bridging block, and the further action modules being connected to the respective third faces of the transition modules.

* * * * *